(12) United States Patent
Koo et al.

(10) Patent No.: US 6,771,958 B1
(45) Date of Patent: Aug. 3, 2004

(54) SUPPORTING CONCENTRATOR IN MULTIPLE PAGING CHANNEL ENVIRONMENT

(75) Inventors: Yuen-Yin L. Koo, Morristown, NJ (US); Semyon B. Mizikovsky, Morganville, NJ (US); Eshwar Pittampalli, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/293,330

(22) Filed: Apr. 16, 1999

(51) Int. Cl.[7] .............................................. H04Q 7/20
(52) U.S. Cl. .................... 455/426.1; 455/458; 455/11.1
(58) Field of Search .......................... 455/426.1, 426.2, 455/458, 11.1, 435.1, 450, 7

(56) References Cited

U.S. PATENT DOCUMENTS

| | | | |
|---|---|---|---|
| 5,519,761 A | 5/1996 | Gilhousen | 379/59 |
| 5,544,223 A | 8/1996 | Robbins | 379/58 |
| 5,627,881 A | 5/1997 | Fletcher | 379/60 |
| 5,787,355 A | 7/1998 | Bannister et al. | 455/458 |
| 5,790,938 A | 8/1998 | Talarmo | 455/11.1 |
| 5,907,794 A * | 5/1999 | Lehmusto et al. | 455/11.1 |
| 5,974,325 A * | 10/1999 | Kotzin et al. | 455/450 |
| 5,978,683 A | 11/1999 | Kunisawa | 455/462 |
| 5,995,804 A * | 11/1999 | Rootsey et al. | 455/11.1 |
| 6,141,533 A * | 10/2000 | Wilson et al. | 455/11.1 |

FOREIGN PATENT DOCUMENTS

| | | | |
|---|---|---|---|
| GB | 2177244 A | 1/1987 | H04B/5/04 |
| GB | 2260467 A | 4/1993 | H04B/7/204 |
| KR | 2000-0004822 | 1/2000 | |

* cited by examiner

Primary Examiner—Erika Gary

(57) ABSTRACT

A paging signal is detected where the paging signal is intended for a mobile-telephone having a paging channel frequency that is different than a paging channel frequency associated with a concentrator. A base station transmits a base station-to-mobile-telephone (BS-MT) paging message by including such BS-MT paging message in a base station-to-concentrator (BS-C) paging message. The BS-MT paging message includes a message portion and a mobile-telephone identifier portion, wherein the mobile-telephone identifier portion indicates the mobile-telephone to which the BS-MT paging message is intended. The BS-C paging message includes the MT paging message and a concentrator identifier portion for indicating the concentrator to which the BS-C is intended. The BS-C paging message is transmitted over a paging channel on a frequency $f_1$ associated with the intended concentrator (i.e., concentrator through which the mobile-telephone is linked to the base station). The intended concentrator detects the BS-C paging message by monitoring its associated paging channel on frequency $f_1$ for a BS-C paging message with a concentrator identifier portion indicating the concentrator. Upon detecting its BS-C paging message, the concentrator parses the BS-MT paging message from the BS-C message and transmits the BS-MT paging message to the intended mobile-telephone using a paging channel on frequency $f_2$ being monitored by the mobile-telephone.

15 Claims, 5 Drawing Sheets

10

10

60

70

SUPPORTING CONCENTRATOR IN MULTIPLE PAGING CHANNEL ENVIRONMENT

FIELD OF THE INVENTION

The present invention relates generally to wireless communications systems and, in particular, to paging a mobile-telephone in a wireless communications system.

BACKGROUND OF THE RELATED ART

The capacity of wireless communications systems is limited by a variety of factors including total transmission power at base stations. FIG. 1 depicts a wireless communication system 10 comprising at least one base station (BS) 12 in communication with a plurality of mobile-telephones (MT) 14-$j$, where j=1, . . . ,n. BS 12 transmits signals 16-$j$ to MT 14-$j$ over one or more downlink channels. Each signal 16-$j$ has an associated power level $P_j$ at which it is transmitted, wherein the value of power level $P_j$ depends on a variety of factors including distance and interference caused by buildings. The transmission power $P_{BS}$ of BS 12 is equal to the sum of $P_j$, i.e., $$P_{BS} = \sum_{j=1}^{j=n} P_j.$$

However, $P_{BS}$ cannot exceed a maximum transmission power level $P_{max}$ associated with BS 12, i.e., $P_{BS} \leq P_{max}$. Thus, the number of mobile-telephones 14-$j$ BS 12 can be in communication simultaneously (i.e., capacity) is limited by $P_{max}$.

Suppose some mobile-telephones in communication with BS 12 are in building 27, see FIG. 2. BS 12 transmits signals 20-$k$ to MT 14-$k$, wherein each signal 20-$k$ has an associated power level $P_k$ at which it is transmitted, where k=n+1, . . . ,m. In this situation, the transmission power $P_{BS}$ of BS 12 is equal to the sum of $P_j$ and $P_k$, i.e., $$P_{BS} = \sum_{j=1}^{j=n} P_j + \sum_{k=n+1}^{k=m} P_k.$$

However, since mobile-telephones 14-$k$ are indoors, the interference level (due to the presence of building 27) is greater between MT 14-$k$ and BS 12 than between MT 14-$j$ and BS 12. Thus, the power level $P_k$ required for mobile-telephones 14-$k$ to receive signal 20-$k$ at an acceptable signal level will likely be higher than the power level $P_j$ required for mobile-telephones 12-$j$ to receive signal 16-$j$ at an acceptable signal level, i.e., $P_k$ is likely greater than $P_j$. Because MT 14-$k$ utilize more of BS 12's transmission power resources, the number of mobile-telephones that BS 12 can be in communication simultaneously is reduced.

One way to increase the capacity in the situation depicted in FIG. 2 is to use a device referred herein as a concentrator. FIG. 2$a$ illustrates a wireless communication system in which a concentrator 25 is incorporated. Concentrator 25 is a device having the functionality of a base station. Specifically, concentrator 25 is configured to communicate with mobile-telephones in building 27, such as MT 14-$k$, using frequency $f_2$ and with base station 12 using frequency $f_1$. Any transmission from BS 12 to MT 14-$k$, or vice-versa, goes through concentrator 25. For example, BS 12 transmits a signal having a message intended for MT 14-$k$ to concentrator 25 over a communication channel on frequency $f_1$. Upon receipt of the signal, concentrator 25 demodulates the message and re-modulates the message for re-transmission to MT 14-$k$ over a communication channel on frequency $f_2$, wherein the signal transmitted from BS 12 to concentrator 25 is transmitted at power level $P_c$. Advantageously, the transmission power $P_c$ associated with a frequency $f_1$ signal being transmitted from concentrator 25 to BS 12 would be less than the transmission power $P_k$ associated with a frequency $f_1$ signal being transmitted from MT 14-$k$ directly to BS 12 (since signal be would not suffer interference due to building 27 before arriving at the concentrator). Thus, the total transmission power $P_{BS}$ of BS 12 would be equal to sum of $P_j$ plus $mP_c$, where m-n-1 corresponds to the number of mobile-telephones inside building 27 in communication with BS 12 via concentrator 25, i.e., $$P_{BS} = \sum_{j=1}^{j=n} P_j + (m-n-1)P_c.$$

When BS 12 desires to page a mobile-telephone, BS 12 transmits a paging signal using a paging channel on frequency $f_1$ associated with that mobile-telephone. Each mobile-telephones is associated with only one paging channel from a set of paging channels on frequency $f_1$. Thus, different mobile-telephones may be associated with different paging channels on frequency $f_1$. In order for concentrator 25 to detect paging signals on different frequency $f_1$ paging channels intended for MT 14-$k$ in building 27 (and subsequently re-transmit on a paging channel on frequency $f_2$), concentrator 25 needs to be capable of at least monitoring all the paging channels associated with the mobile-telephones 14-$k$. However, concentrators are typically capable of only monitoring a single paging channel on frequency $f_1$. Thus, unless the paging channel associated with the mobile-telephone to which the paging signal is intended is identical to the paging channel being monitored by (or associated with) concentrator 25, the paging signal will not be detected by concentrator 25 (and will not be re-transmitted to the intended mobile-telephone). Accordingly, there exist a need for a concentrator to detect a paging signal intended for a mobile-telephone having an associated paging channel on frequency $f_1$ different than a paging channel on frequency $f_1$ associated with the concentrator.

SUMMARY OF THE INVENTION

The present invention is a method and apparatus for detecting a paging signal intended for a mobile-telephone having an associated frequency $f_1$ paging channel different from a frequency $f_1$ paging channel associated with a concentrator. The present invention uses the paging channel on frequency $f_1$ associated with the concentrator to send a paging signal to a mobile-telephone having an associated paging channel on frequency $f_2$ different than the concentrator's paging channel on frequency $f_1$. In one embodiment, a base station transmits a base station-to-mobile-telephone (BS-MT) paging message by including such BS-MT paging message in a base station-to-concentrator (BS-C) paging message. The BS-MT paging message includes a message portion and a mobile-telephone identifier portion, wherein the mobile-telephone identifier portion indicates the mobile-telephone to which the BS-MT paging message is intended. The BS-C paging message includes the MT paging message and a concentrator identifier portion for indicating the concentrator to which the BS-C is intended. The BS-C paging message is transmitted over a paging channel on frequency $f_1$ associated with the intended concentrator (i.e., concentrator through which the mobile-telephone is linked to the base station). The intended concentrator detects the BS-C paging message by monitoring its associated paging channel on frequency $f_1$ for a BS-C paging message with a concentrator identifier portion indicating the concentrator. Upon detecting its BS-C paging message, the concentrator parses the BS-MT paging message from the BS-C message and transmits the BS-MT paging message to the intended mobile-telephone using a paging channel on frequency $f_2$ being monitored by the mobile-telephone.

In one embodiment, the base station uses a location registry to determine the paging channel on frequency $f_1$ over which to send a BS-MT paging message to the mobile-telephone, wherein the location registry includes information indicating whether a mobile-telephone linked to the base station via a concentrator and, if applicable, a concentrator identifier and an indication of the paging channel associated with the concentrator. If the intended mobile-telephone is linked to the base station via a concentrator, the base station uses the location registry to determine the paging channel on frequency $f_1$ associated with the concentrator before sending a BS-C paging message having the BS-MT paging message on that paging channel.

BRIEF DESCRIPTION OF THE DRAWINGS

The features, aspects, and advantages of the present invention will become better understood with regard to the following description, appended claims, and accompanying drawings where

DETAILED DESCRIPTION

Figure 1:
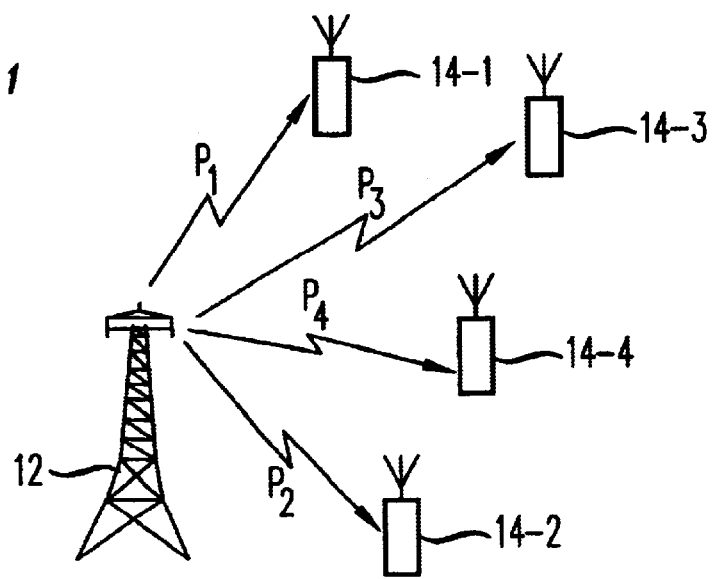
FIG. 1 depicts a wireless communication system comprising at least one base station in communication with a plurality of mobile-telephones.
Figure 2:
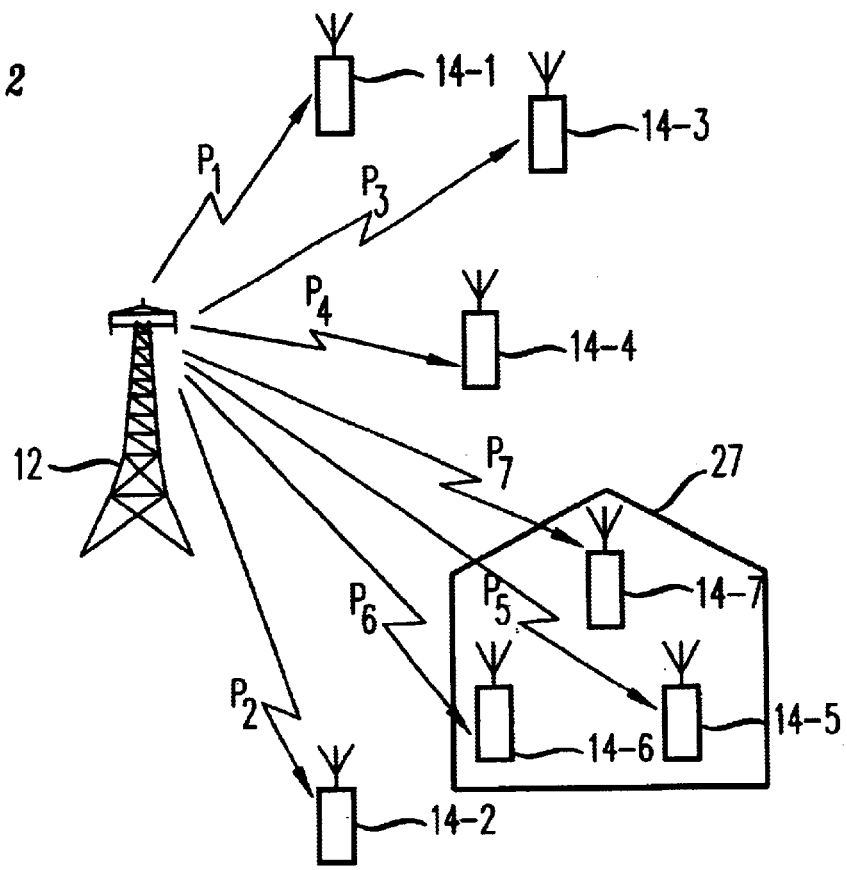
FIG. 2 depicts a wireless communication system of FIG. 1 where some mobile-telephones are indoors.
Figure 2A:
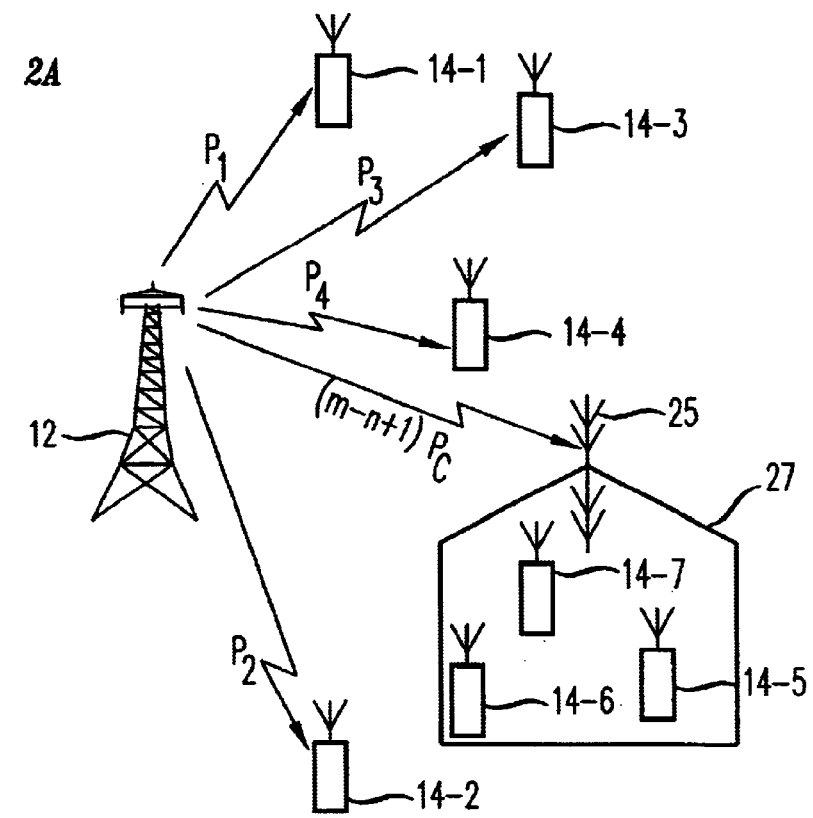
FIG. 2a depicts a wireless communication system of FIG. 2 in which a concentrator is incorporated.
Figure 3:
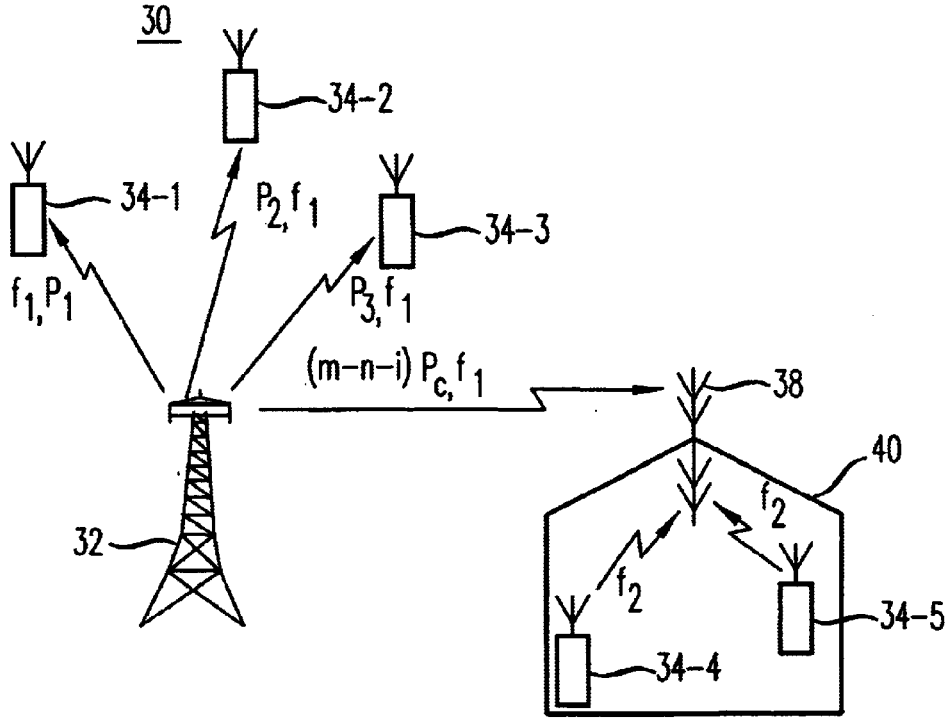
FIG. 3 depicts a wireless communications system used in accordance with the present invention.

FIG. 3 depicts a wireless communications system 30 used in accordance with the present invention. Wireless communications system 30 comprises at least one base station 32, a plurality of mobile-telephones 34-$j$ outdoors, a plurality of mobile-telephones 34-$k$ indoors and at least one concentrator 38, wherein concentrator 38 is a device having base station functionality, $j=1,\ldots,n$ and $k=n+1,\ldots,m$. MT 34-$j$ and 34-$k$ being operable to communicate with BS 32 using frequency $f_1$, and to communicate with concentrator 38 using frequency $f_2$. Concentrator 38 being operable to communicate with base station 32 using frequency $f_1$. For illustrative purposes, concentrator 38 is shown as being mounted on top of a building 40 and configured to communicate with mobile-telephones in building 40, such as MT 34-$k$, using frequency $f_2$ and with base station 32 using frequency $f_1$. In one embodiment, frequency $f_1$ is identical to frequency $f_2$. In another embodiment, frequency $f_1$ is not identical to frequency $f_2$. In a third embodiment, frequency $f_1$ is any wireless operating frequency, such as the frequencies associated with cellular, PCS or ISM, and frequency $f_2$ is not a wireless operating frequency. Note that frequencies $f_2$ and $f_1$ include uplink and downlink frequencies.

Figure 4:
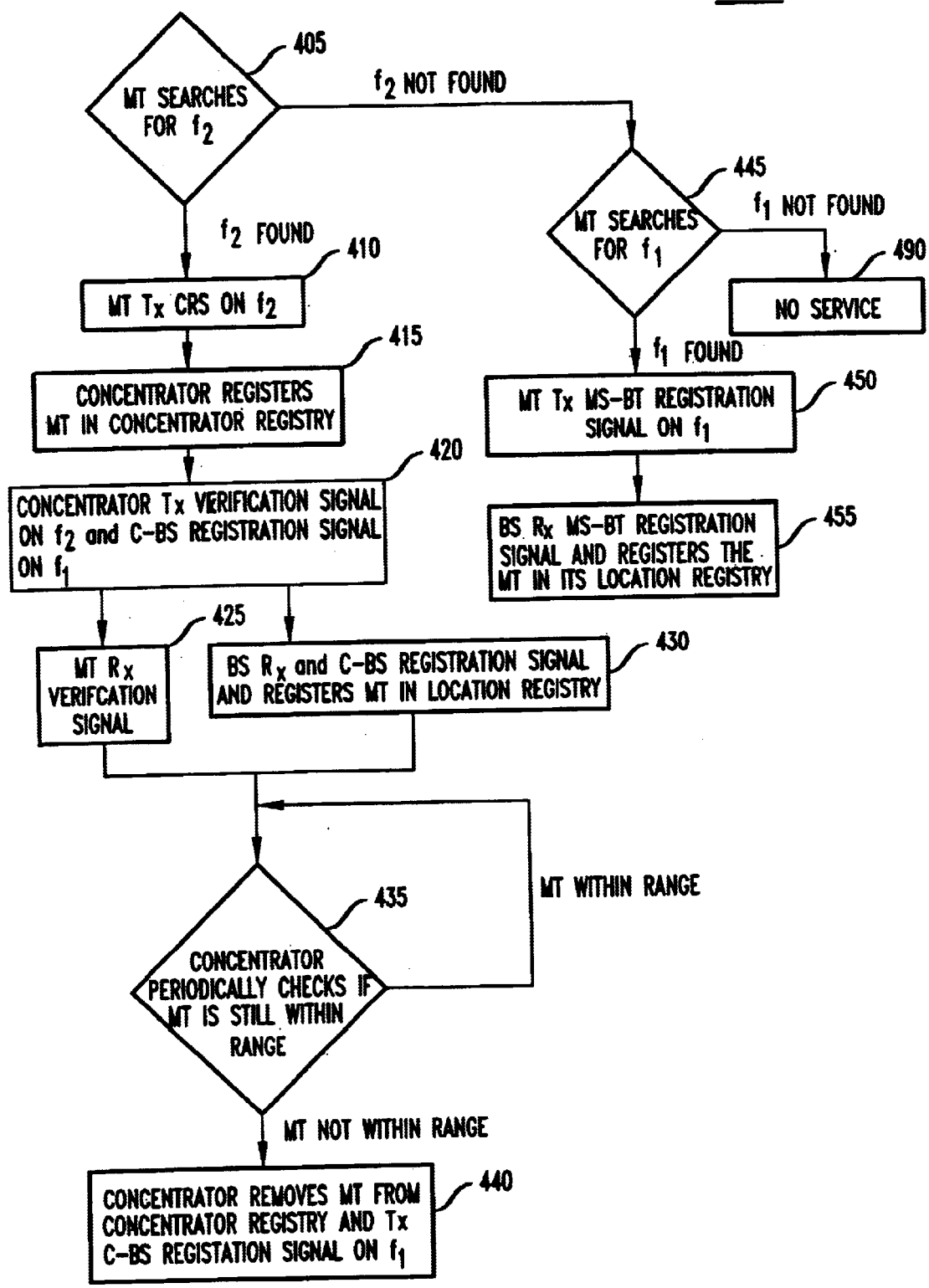
FIG. 4 depicts a flow chart illustrating a registration process in accordance with the present invention.

In order to use the services of base station 32, mobile-telephones 34-$j$ and 34-$k$ are required to first register with base station 32. FIG. 4 depicts a flow chart 400 illustrating a registration process in accordance with the present invention. In step 405, when a mobile-telephone is powered on, it first searches frequency $f_2$ for a signal transmitted from concentrator 38. If the mobile-telephone detects a frequency $f_2$ signal, e.g., MT 34-$k$, the mobile-telephone transmits a concentrator registration signal (CRS) to concentrator 38 using a communication channel on frequency $f_2$, in step 410, wherein the concentrator registration signal includes a first set of mobile-telephone information, such as a mobile-telephone identification number (MIN), which is a unique mobile-telephone identifier. In steps 415 and 420, concentrator 38 registers the mobile-telephone in a concentrator registry using the first set of mobile-telephone information, and then transmits a verification signal to the mobile-telephone using a paging channel on frequency $f_2$ and a concentrator to base station (C-BS) registration signal to BS 32 using an access channel on frequency $f_1$, wherein the verification signal indicates to the mobile-telephone that it has been registered with the concentrator and the C-BS registration signal includes at least a portion of the first set of mobile-telephone information and concentrator information, such as a concentrator identification number or some other concentrator identifier. Note that the present invention should not be limited to paging and access channels on frequencies $f_1$ and $f_2$. Other communication channels may also be used.

Upon receiving the verification signal, in step 425, the mobile-telephone will know that it has been registered with concentrator 38 and, thus, will know to use frequency $f_2$ to receive and transmit signals from and to concentrator 38 and BS 12 (through concentrator 38). Upon receiving the C-BS registration signal from concentrator 38, in step 430, base station 32 uses the mobile-telephone and concentrator information in the C-BS registration signal to register the mobile-telephone (associated with the mobile-telephone information contained in the C-BS registration signal) in a location registry, such as a home or visitor location registry or some other location registry associating the mobile-telephone to the concentrator. Note that the location registry should indicate an association between the mobile-telephone and concentrator 38 in this instance.

In step 435, concentrator 38 periodically checks to determine whether the mobile-telephone is still within the range of concentrator 38. If the mobile-telephone is no longer within the concentrator's range, the mobile-telephone is removed from the concentrator registry and a signal is transmitted to BS 32 via the access channel on frequency $f_1$ an update C-BS registration signal to indicate to BS 32 to unregister the mobile-telephone in its location registry, in step 440.

If the mobile-telephone does not detect a frequency $f_2$ signal, the mobile-telephone then searches frequency $f_1$ for a signal transmitted from base station 32, in step 445. If the mobile-telephone does not detect a frequency $f_1$ signal, the mobile-telephone cannot gain system access to wireless communications system 30. If the mobile-telephone detects a frequency $f_1$ signal, e.g., MT 34-$j$, the mobile-telephone transmits a mobile-telephone to base station (MS-BT) registration signal to base station 32 using frequency $f_1$, in step 450, wherein the MT-BS registration signal includes a second set of mobile-telephone information, such as the MIN. Note that the first and second set of mobile-telephone information may be identical, overlapping or different. Upon receiving the MT-BS registration signal from the mobile-telephone, in step 455, base station 32 uses the second set of mobile-telephone information to register the mobile-telephone (associated with the mobile-telephone information contained in the MT-BS registration signal) in the location registry.

Figure 5:
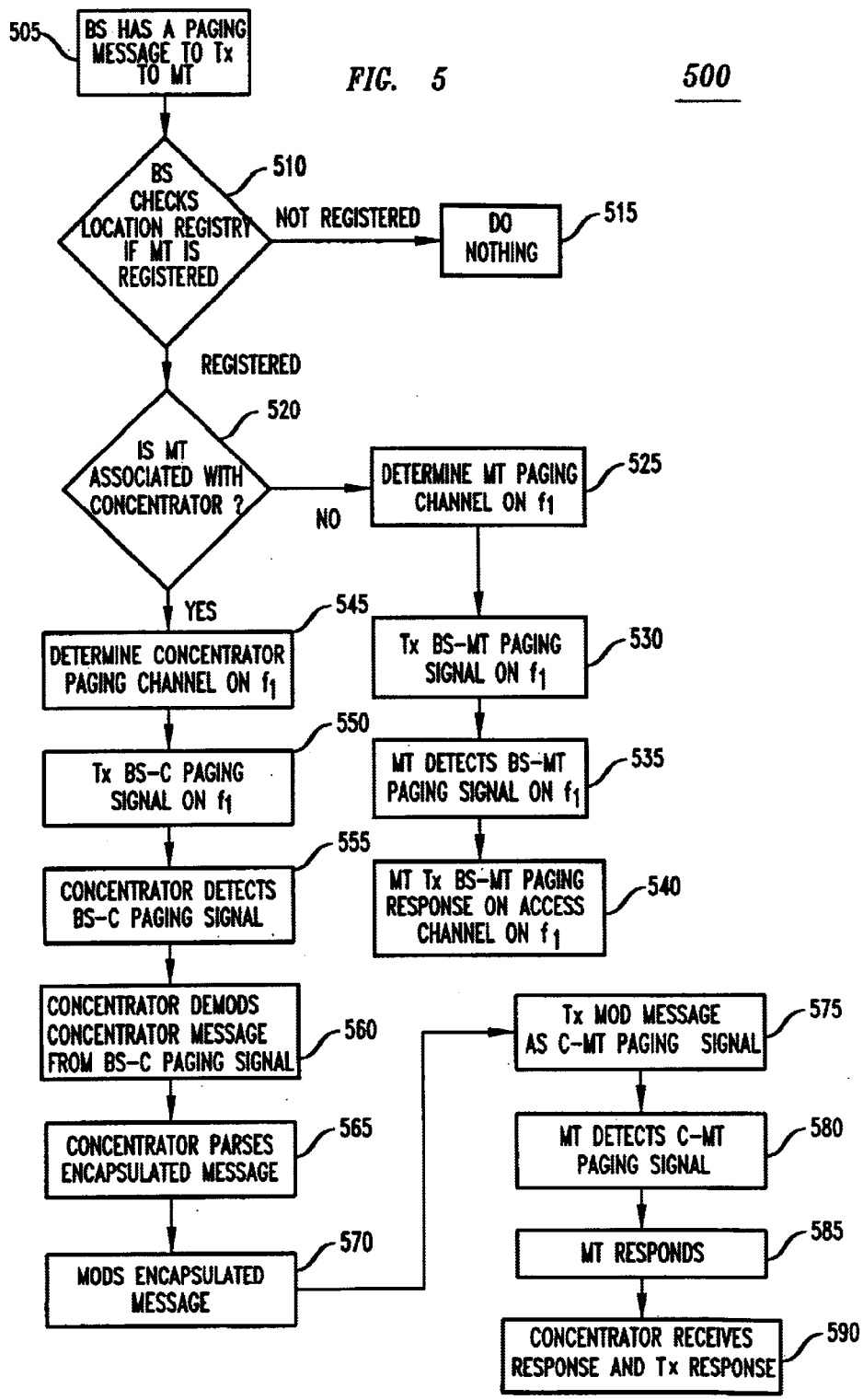
FIG. 5 depicts a flow chart illustrating a paging process in accordance with the present invention.

Once the mobile-telephone is registered at BS 32 in the location registry, BS 32 can page the mobile-telephone using one of a plurality of paging channels on frequency $f_1$. BS 32 pages the mobile-telephone by transmitting a paging signal over a paging channel directly or indirectly associated with the mobile-telephone to which the paging signal is intended. FIG. 5 depicts a flow chart 500 illustrating a paging process in accordance with the present invention. In step 505, BS 32 has a page to send to a mobile-telephone. In step 510, BS 32 looks at the location registry to see whether the mobile-telephone has been registered. If BS 32 determines that the mobile-telephone has not been registered, BS 32 does nothing, in step 515. If the mobile-telephone has been registered, BS 32 uses the location registry to determine whether the mobile-telephone is associated with a concentrator, in step 520. Recall that an association will be indicated in the location registry between the mobile-telephone and concentrator 38 if the mobile-telephone was registered with BS 32 via concentrator 48.

Figure 6:
FIG. 6 depicts one embodiment of a data structure for a BS-MT paging message.

If the mobile-telephone is not associated with a concentrator, e.g., MT 34-$j$, BS 32 determines what paging channel on frequency $f_1$ is associated with the mobile-telephone before paging the mobile-telephone with a BS-MT paging signal, in steps 525 and 530. A paging channel can be associated with a mobile-telephone in a variety of manners. One such manner involves using the MIN and a well-known paging channel hashing algorithm, such as the paging channel hashing algorithm defined in code division multiple access standards. For example, the paging channel hashing algorithm will output the last digit of the MIN, which will indicate the paging channel associated with the mobile-telephone. Note that the mobile-telephone will only monitor for pages on its associated paging channel on frequency $f_1$. In one embodiment, the BS-MT paging signal includes a BS-MT paging message comprising the MIN and a message for the mobile-telephone to which the paging signal is intended. See FIG. 6, which depicts a possible data structure 60 for a BS-MT paging message.

In step 535, the mobile-telephone detects the BS-MT paging signal by searching its associated paging channel on frequency $f_1$ for a BS-MT paging signal intended for it (as indicated by the MIN, for example). In step 540, the mobile-telephone can respond by transmitting a MT-BS page response signal over an access channel on frequency $f_1$, wherein the MT-BS page response includes mobile-telephone information, such as the MIN, and an appropriate response message.

Figure 7:
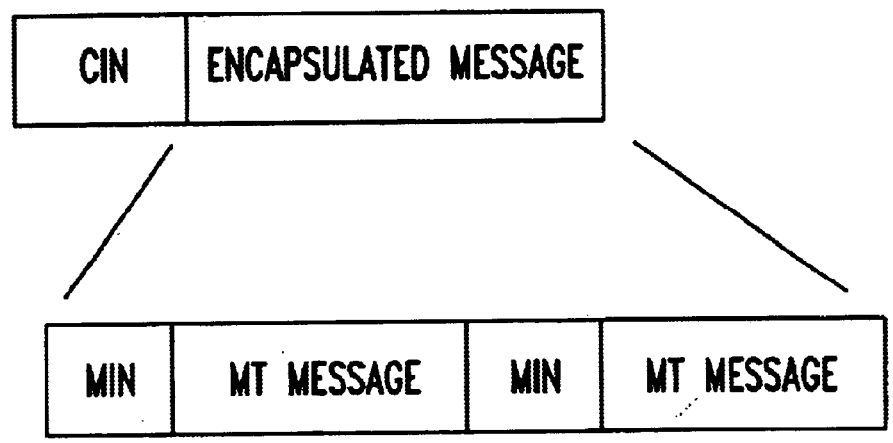
FIG. 7 depicts one embodiment of a data structure for a concentrator message.

If the mobile-telephone is associated with a concentrator, e.g., MT 34-$k$, BS 32 determines what paging channel on frequency $f_1$ is associated with the concentrator before transmitting a base station-to-concentrator (BS-C) paging signal to the mobile-telephone via that paging channel, in steps 545 and 550. In one embodiment, the BS-C paging signal includes a concentrator message having the concentrator identification number and an encapsulated message, wherein the encapsulated message includes one or more BS-MT paging messages having MINs and messages for one or more mobile-telephones to which the paging signal is ultimately intended. See FIG. 7, which depicts a possible data structure 70 for a concentrator message. Note that the concentrator message is essentially the BS-MT paging message with a concentrator identifier portion prepended (or appended) to it.

A paging channel can be associated with a concentrator in a variety of manners. One such manner involves pre-association of paging channels to concentrators, or using the concentrator identification number and the paging channel hashing algorithm. For example, a class is assigned to a concentrator when the concentrator is put into service, wherein each class has an associated paging channel. The total number of classes is limited to seven or less (for a three bit value), wherein the value of seven corresponds to a maximum number of paging channels for a base station. When multiple concentrators are located within the coverage area of a base station, the concentrator class assignment should balance the number of concentrators in service among the seven classes. Specifically, in this example, when there are less than seven concentrators in service, each concentrator should be assigned a different class. If there are more than seven concentrators in service, the class may assigned using the following equation:

$$\text{class for } i\text{th concentrator} = ((i-1) \bmod N) + 1 \qquad \text{equation (1)}$$

where N is the number of total paging channels available for association with a class, and not necessarily the total number of paging channels for a base station.

Note that each concentrator preferably has only one frequency $f_1$ paging channel to which it is associated. This limits the number of paging channels a concentrator has to search (when searching for pages intended for the concentrator). In another embodiment, the concentrator may be configured to search a multitude of paging channels. In this embodiment, the concentrator can determine which paging channels are associated with the mobile-telephones in its concentrator registry and search all such paging channels for pages intended for those mobile-telephones.

In another embodiment, the location registry also indicates a paging channel for the mobile-telephones, wherein the paging channel indicated is a concentrator's paging channel if the mobile-telephone is associated with a concentrator or the mobile-telephone's associated paging channel. Thus, in this embodiment, step 520 is eliminated and steps 525 to 550 are modified.

In step 555, concentrator 38 detects the BS-C paging signal by searching its associated paging channel for a BS-C paging signal intended for it (as indicated by the concentrator identification number, for example). In step 560, concentrator 38 demodulates the concentrator message from the BS-C paging signal. In steps 565 to 575, concentrator 38 parses the encapsulated message from the concentrator message, modulates the encapsulated message onto a paging channel on frequency $f_2$ and transmits the modulated encapsulated message as a concentrator-to-mobile-telephone (C-MT) paging signal on the frequency $f_2$ paging channel. Note that concentrator 38 may use its concentrator registry to check whether the mobile-telephones to which the encapsulate message is intended is still within range of concentrator 38. If the mobile-telephone is no longer registered, concentrator 38 does nothing with the message and provides BS 32 with an update C-BS registration signal over an access channel on frequency $f_1$ to indicate to BS 32 to unregister the mobile-telephone in its location registry.

Preferably, all mobile-telephones registered with concentrator 38 use a same paging channel. If not, then concentrator 38 parses each individual BS-MT paging message from the encapsulated message, determine a paging channel on frequency $f_2$ associated with each BS-MT paging message (which may be indicated in the concentrator registry), modulate each BS-MT paging messages onto its appropriate paging channel on frequency $f_2$, and transmit the modulated BS-MT paging messages.

In step 580, the mobile-telephone detects the C-MT paging signal by searching the one paging channel (or its associated paging channel) on frequency $f_2$ for a C-MT paging signal intended for it (as indicated by the MIN, for example). In step 585, the mobile-telephone can respond by transmitting a mobile-telephone-to-concentrator (MT-C) page response signal over an access channel on frequency $f_2$, wherein the MT-C page response signal includes a MT-BS message having mobile-telephone information, such as the MIN, and an appropriate response message to the BS-C message. In step 590, concentrator 38 demodulates the MT-BS message from the MT-C page response signal, modulates the MT-BS message onto an access channel on frequency $f_1$, and transmit the modulated MT-BS message as a C-BS signal.

The present invention include several possible schemes for assigning paging channels. Five schemes are described herein, but this should not be construed to limit the present invention to these five schemes. Other schemes are possible. In a first scheme, all paging channels may be used to page mobile-telephones and concentrators. The paging channel assigned [$R_1$] for concentrator j is calculated as follows:

$$R_1 = ((J-1) \bmod N) + 1 \qquad \text{equation (2)}$$

where N is the total number of supported paging channels and J is the class of the concentrator.

In a second scheme, a set of paging channels is dedicated to the concentrators. The paging channel assigned [$R_2$] for concentrator j is calculated as follows:

$$R_2 = ((J1) \bmod M) + N + 1 \qquad \text{equation (3)}$$

where $N \geq 1$ is the number of paging channels available for regular mobile-telephones excluding those connected to concentrators, $M \geq 1$ is the number of paging channels dedicated only for concentrators, and J is the class of the concentrator.

In a third scheme, only a selected subset of the paging channels is available for use by the concentrators. The paging channel assigned [$R_3$] for concentrator j is calculated with the following function:

$$R_3 = ((J-1) \bmod K) + \text{Offset} + 1 \qquad \text{equation (4)}$$

where $K \geq 1$ is the number of paging channels available for concentrators, Offset $\geq 0$ is the offset number from the Primary paging channel where the first paging channel available for the concentrators resides, and J is the class of the concentrator.

Note that the third scheme represents the general case of static paging channel selection for concentrators. By comparison, the first scheme is a special case of the third scheme. In the first scheme, only the supported paging channels are available for concentrators, and these channels are also shared with regular mobile terminals. Thus, K=N, and Offset=0. The second scheme is also a special case of the third scheme. In the second scheme, a set of M paging channels is dedicated to concentrators, but this set is outside the range of the supported paging channels available for regular mobile terminals. Hence K=M, and Offset=N.

In a fourth scheme, the present invention assigns paging channels with the goal of averaging the load on the system supported paging channels over time using a periodically modified parameter. Such parameter can depend on a System Time jointly and synchronously monitored by base stations and mobile terminals. Therefore, no additional external synchronization would be needed for an event causing re-selection of a paging channel. In an embodiment of the fourth scheme, the paging channel assigned [$R_4$] for concentrator J is calculated with the following function:

$$R_3 = (((J-1) + \lfloor t/2^{T+1} \rfloor) \bmod K) + \text{Offset} + 1 \qquad \text{equation (5)}$$

The parameter t represents the absolute System Time in the units of $2^{16}$ 80 msec paging slots, or approximately 2.73 min units. Such unit represents a maximal allowable paging slot cycle, according to the current standard TIA/EIA/95-B and TIA/EIA/IS-2000. At the same time, it represents half of the smallest interval for re-selecting the paging channel for concentrator. The parameter $2^{T+1}$ represents the length of the interval, in units of maximum allowable paging slot cycles, for re-selection of paging channel for concentrators. The value of T can vary from 0 to 15 depending on operational environment. For example, when T=0, the re-selection interval is equal to the 2 maximum allowable paging slot cycles, or 5.46 min; when T=15, the re-selection interval is the largest, equal to infinity, and paging channel re-selection becomes independent on the System Time, thereby accommodating third scheme. In short, the fourth scheme represents a general case of paging channel selection for static and dynamic operating environment.

In a fifth scheme, the present invention defines an association of the concentrator class J with a specific value I representing a 32-bit "identity" of the concentrator class. This 32-bit value I can be generated as follows:

$$I = (C_1 \times J + C_2)$$

Where $C_1$ and $C_2$ are any pre-selected 28-bit random numbers.

The I is subsequently used by both base station and concentrator in place of the 32 least significant bits of a mobile station IMSI as defined in the current standard TLA/EIA/95-B and TIA/EIA/IS-2000 for hashing selection of the CDMA Channel and Paging Channel Slot.

It is expected that concentrators, as permanently powered devices, will not need to conserve the battery power, and thus will not operate in a slotted mode. As all paging channel slots will be monitored, the base station can communicate with any individual mobile-telephone combined in the concentrator on any paging channel slot. Alternatively, all mobile-telephones combined in the concentrator can have the same slot cycle index, and therefore using the I identity for hashing will result in the same paging channel slot. Therefore, all mobile-telephones combined in the concentrator will be monitoring the same paging channel slot. When it is not the case, the concentrator can monitor all paging channel slots associated with individual identities of mobile terminal combined in the concentrator.

The fifth scheme can also be used for selection of the paging channel instead of schemes 1 through 4, however, inherent flexibility of assigning dedicated paging channels for concentrators outside the supported paging channel range will be missed.

All above schemes are based on assignment of the Concentrator Class J. In one alternative, this value has to be communicated from the Home Location Register (HLR) to the Visited Location Register (VLR) at the time of registration. The HLR will need to maintain an association of individual mobile terminal identities (IMSI) with specific Concentrator Class J. In another alternative, the value J can be communicated by the concentrator to the base station over the air interface during explicit and implicit registrations. The HLR in this case does not need to maintain the J values. In both cases, when the VLR registration record is created, the value of J—which is limited to a maximum of 3 bits—is stored in addition to the mobile terminal IMSI. When the serving system needs to communicate with an individual mobile terminal, it queries the VLR record for this mobile terminal and receives the value of J which is used to derive the Operating Frequency, Paging Channel Number, and Paging Channel Slot monitored by the concentrator.

In one embodiment, concentrator 38 comprises a plurality of antennas for transmitting and receiving signals from BS 32 and mobile-telephones 34 -*k*, a modulator/demodulator for modulating and demodulating frequency $f_1$ and $f_2$ signals, a multiplexer/demultiplexer for multiplexing and demultiplexing signals or messages onto a communication channel and a processor associated with computer memory and programmed to create and maintain a concentrator registry. Concentrator may also have other software and hardware for performing a variety of base station functionalities.

The present invention is described herein with reference to certain embodiments. Other embodiments are possible. For example, concentrator 38 can be connected to base station 32 via a wired interface (instead of an air interface). Alternately, concentrator 38 can also be connected via a wired or wireless interface to another type of communication device, such as a telephone, another concentrator or a PBX system. In the PBX example, concentrator 38 pages a telephone connected to the PBX system using a telephone number or some other type of identifier. Accordingly, the present invention should not be limited to the embodiments disclosed herein.

We claim:

1. A method for paging a communications device comprising the steps of:
   determining a first communication channel at a frequency $f_1$ and at a first power level associated with a concentrator, the concentrator being capable of functioning as a base station, over which to transmit a message in a wireless protocol to a communications device; and
   transmitting the message over the first communication channel at the first frequency $f_1$ and at the first power level to the concentrator the concentrator being further capable of demodulating the message and re-modulating the message over a second communication channel using a frequency $f_2$, a second power level and the same wireless protocol; and
   receiving a concentrator-base station registration signal over the first communication channel wherein the frequencies $f_1$ and $f_2$ are not the same and the first power level is less than a power level associated with a signal transmitted directly to the communication device from a base station.

2. The method of claim 1, wherein the message includes a mobile identification number and a sub-message for the communications device.

3. The method of claim 1 comprising the step of:
   adding a concentrator identification number to the message before transmitting the message.

4. The method of claim 1, wherein the first communication channel is determined using a location registry that associates the communications device to the concentrator.

5. The method of claim 4, wherein the first communication channel is determined using a paging channel hashing algorithm.

6. The method of claim 4, wherein the first communication channel is determined using concentrator classes.

7. The method of claim 1 comprising the additional step of:
   associating the concentrator to the communications device in a registry.

8. The method of claim 1, wherein the frequency $f_1$ and the frequency $f_2$ are identical.

9. The method of claim 1 comprising the additional step of:
   receiving information associating the communications device to the concentrator.

10. A concentrator having at least the functionality of a base station comprising:
    means for transmitting a concentrator-base station registration signal including a concentrator identification number to a base station over a communication channel on frequency $f_1$;
    means for transmitting a verification signal to a communications device over a communication channel of frequency $f_2$;
    a concentrator registry for storing information associated with the communications device in response to receipt of a concentrator registration signal transmitted by the communications device over the communication channel on frequency $f_2$;
    demodulating a message in a wireless protocol at frequency $f_1$ and a first power level; and
    re-modulating the message in the same wireless protocol at frequency $f_2$ and a second power level,
    wherein the frequencies $f_1$ and $f_2$ are not the same and the first power level is less than a power level associated with a signal transmitted directly to the communications device from a base station.

11. The concentrator of claim 10, wherein communications device is a mobile telephone.

12. The concentrator of claim 10, wherein the communications device is a PBX system.

13. A method for paging a communication device comprising the steps of:
    registering at a concentrator, the concentrator having the functionality of a base station, a communications device in response to a concentrator registration signal received over a second communication channel on frequency $f_2$;
    transmitting a concentrator-base station registration signal including a concentrator identification number over a first communication channel on frequency $f_1$ associated with the concentrator after registering the communications device;
    transmitting a verification signal over the second communication channel on frequency $f_2$ in response to receipt of the concentrator registration signal after registering the communications device;
    monitoring at the concentrator the first communication channel on frequency $f_1$ and at a first power level for a first message in a wireless protocol having a first identifier indicating the concentrator;
    demodulating the first message at frequency $f_1$ and the first power level;

re-modulating and transmitting from the concentrator a second message in the same wireless protocol over the second communication channel on frequency $f_2$ at a second power level if the first message is detected, wherein the second message has a second identifier indicating a communications device to which the second message is intended, and wherein the frequency $f_1$ and $f_2$ are not the same and the first power level is less than a power associated with a signal transmitted directly to the communications device from a base station.

14. The method of claim 13, wherein the first message further includes the second identifier.

15. The method of claim 14 comprising the additional step of:

parsing the second message from the first message before transmitting the second message.

* * * * *